May 16, 1944.  W. L. GASKELL ET AL  2,349,162
WOOD PLANING MACHINE
Filed Dec. 27, 1940   5 Sheets-Sheet 1
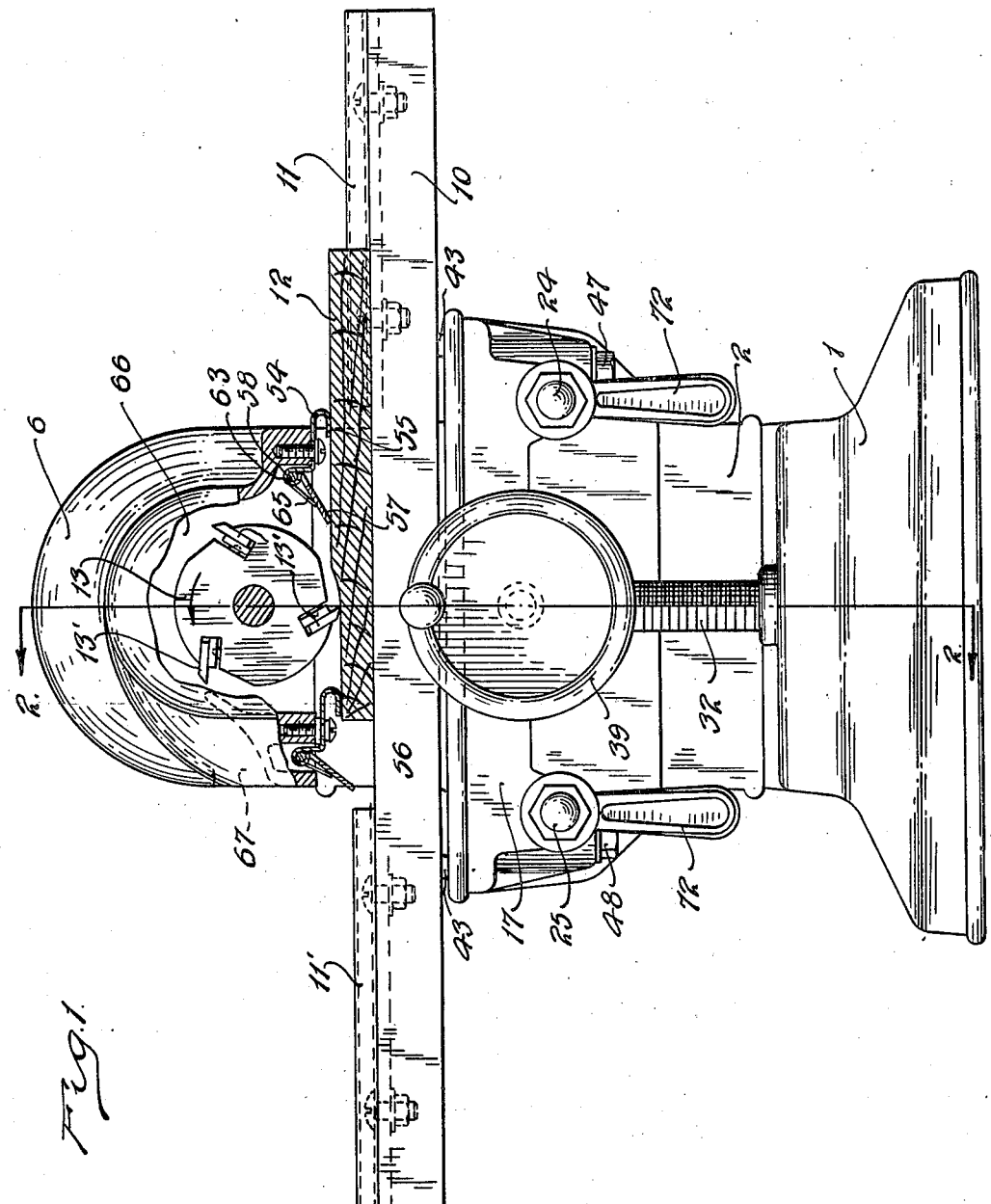
INVENTORS.
WALTER L. GASKELL.
BY OTTO P. HRISCH.
ATTORNEY.

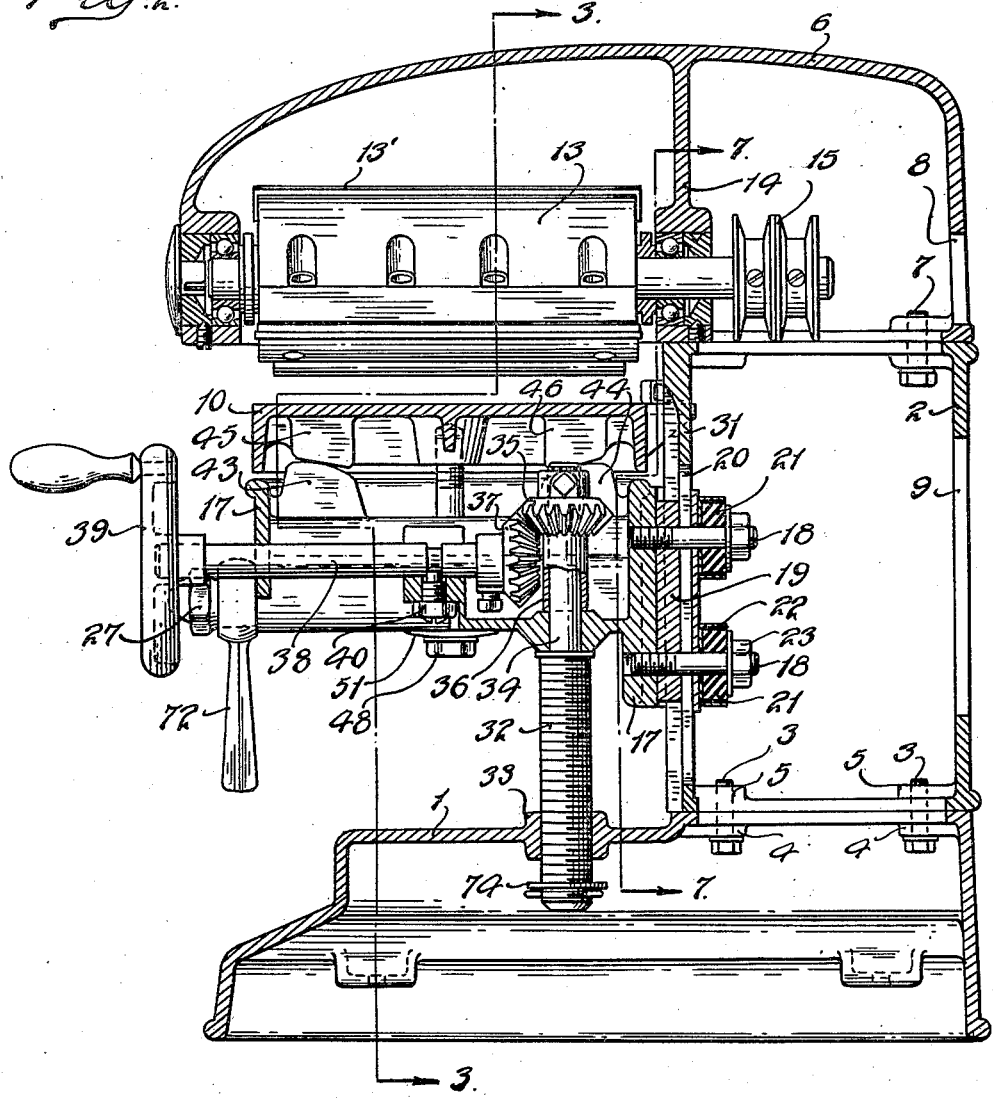

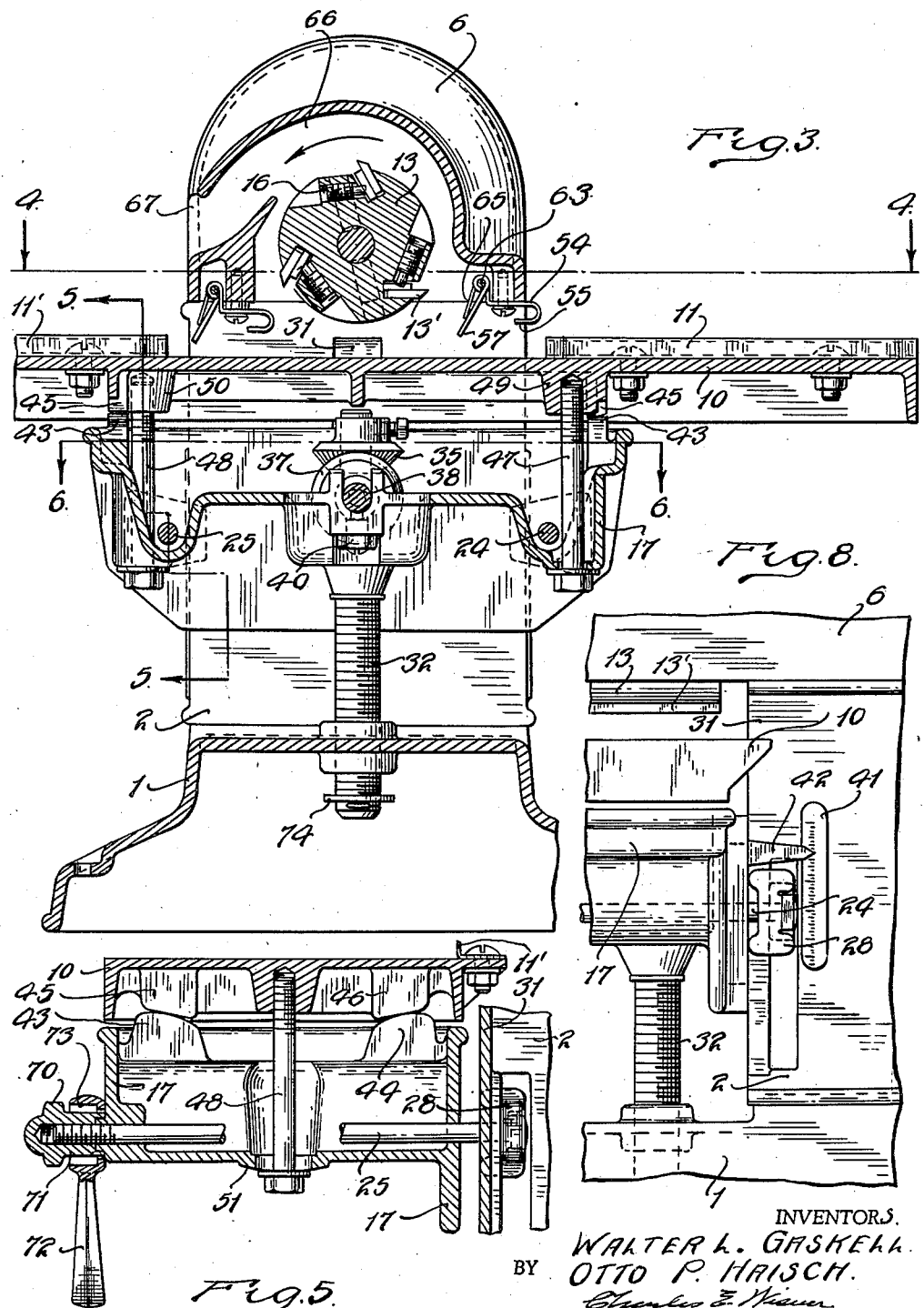

May 16, 1944.   W. L. GASKELL ET AL   2,349,162
WOOD PLANING MACHINE
Filed Dec. 27, 1940   5 Sheets-Sheet 4

INVENTORS.
WALTER L. GASKELL
BY OTTO P. HRISCH
Charles E. Nauer
ATTORNEY.

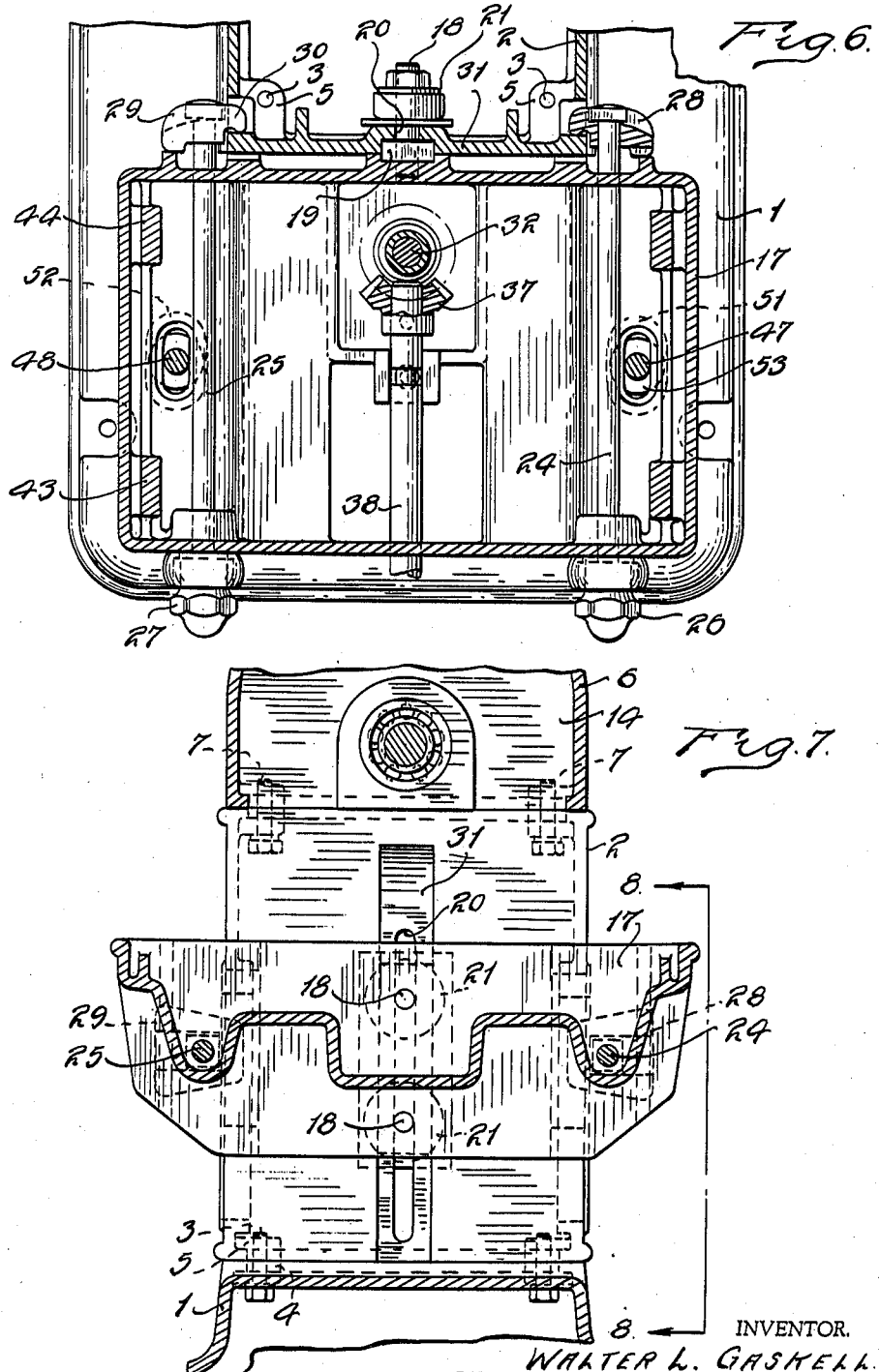

Patented May 16, 1944

2,349,162

UNITED STATES PATENT OFFICE 2,349,162

WOOD-PLANING MACHINE

Walter L. Gaskell, Ypsilanti, and Otto P. Haisch, Ann Arbor, Mich., assignors to Central Specialty Company, Ypsilanti, Mich., a corporation of Michigan Application December 27, 1940, Serial No. 371,886

1 Claim. (Cl. 144—117)

This invention relates to wood planing machines, the object being to provide a new and improved form of thickness planer wherein wood strips of a width the same as or greater or less than the length of the cutter may have the stock removed to provide a strip of the desired thickness.

A principal feature and object of the invention is to provide a planer having a cutter supported by bearings at each end and the supporting frame having an open side to permit strips of a width greater than the length of the cutter to be passed through the planer and then reversed in position to surface the other side of the strip to an equal thickness whereby a wood strip of a width practically twice the length of the cutter blades may be planed.

A further object and feature of the invention is to provide, in conjunction with an open sided planer, a vertically movable table and a gauge associated therewith to adapt the machine for planing wood stock of various thicknesses to a desired final thickness.

Other objects and novel features of the invention are involved in the means for varying the plane of the table in respect to the cutter and rigidly securing the table in the adjusted position and in the provision of a means preventing introduction of stock into the machine greater than a predetermined thickness.

These and other objects and features of the invention are hereinafter more fully described and claimed and a planing machine embodying our invention is shown in the accompanying drawings in which—

Fig. 1 is an elevation having portions thereof partly in section showing the machine in the act of planing wood stock to a predetermined thickness.

Fig. 2 is a vertical section taken on line 2—2 of Fig. 1.

Fig. 3 is a vertical section taken on line 3—3 of Fig. 2.

Fig. 4 is a horizontal section taken on line 4—4 of Fig. 3.

Fig. 5 is a vertical section taken on line 5—5 of Fig. 3.

Fig. 6 is a horizontal section taken on line 6—6 of Fig. 3.

Fig. 7 is a vertical section taken on line 7—7 of Fig. 2.

Fig. 8 is a vertical section taken on line 8—8 of Fig. 7.

Figure 9:
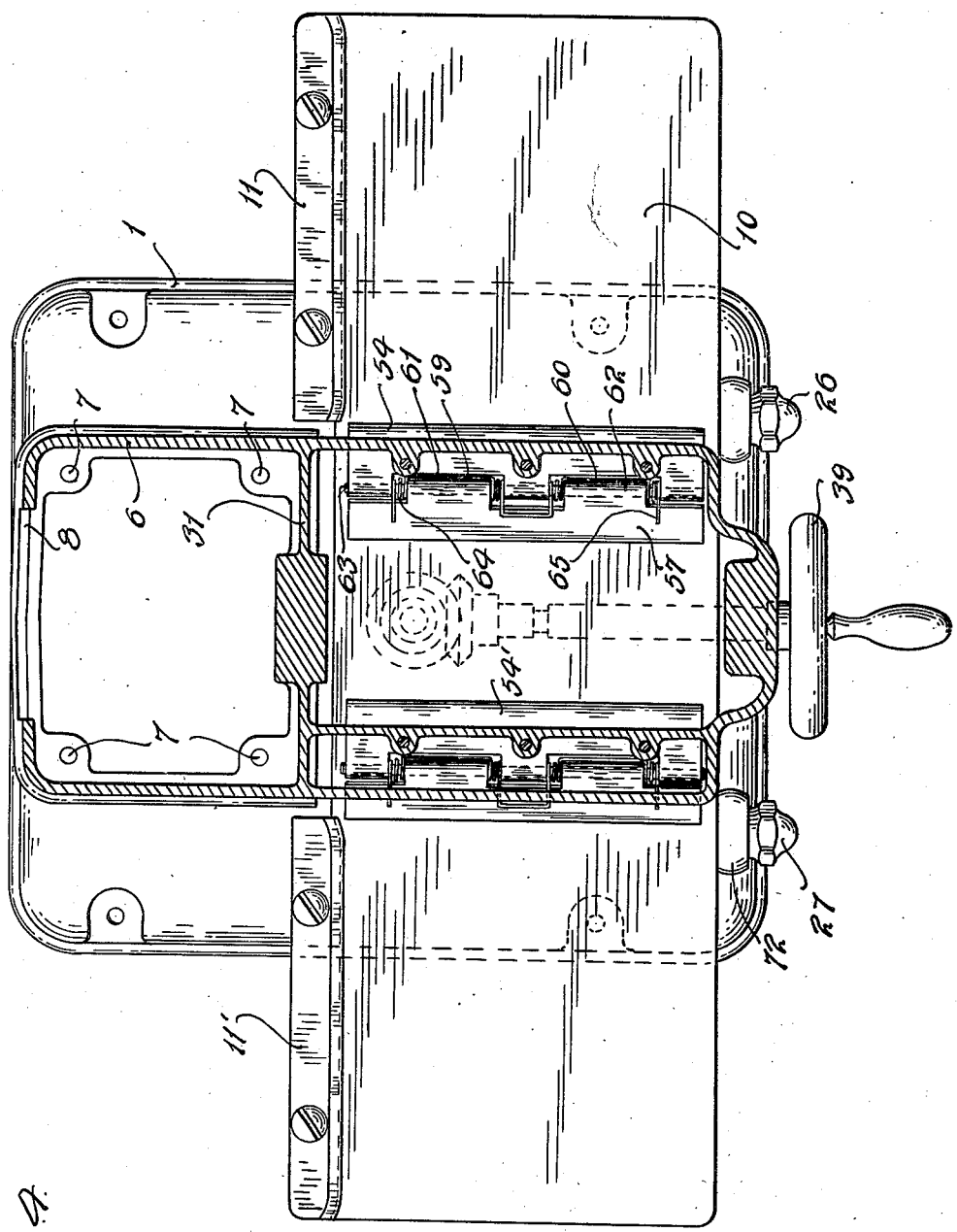

In its preferred form, the machine comprises a base 1 usually formed of cast iron on which a hollow column or standard 2 is secured at one side of the base by the bolts 3 which extend upwardly through lugs 4 of the base into lugs 5 of the column. Secured to the upper end of the column is a cast iron head 6 of hollow form secured at one end, as by the bolts 7, to the upper end of the column 2, there being apertures 8 in the head as shown in Fig. 2, and also an aperture 9 in the column through which the bolts 7 may be introduced and observed in securing the column to the base and the head to the column. The table is indicated at 10 and has rails 11 and 11' forming a guide for the inner edge of the work 12 being planed or surfaced. It will be observed clearly from Fig. 2 that the head 6 extends over the table at one side of the column 2 and provides a support for the outer end of the shaft of the rotary cutter 13.

The head 6 is provided with a wall 14 which is apertured to provide a support for the bearing through which the inner end of the cutter shaft projects and is there provided with a driving pulley 15 which may be driven from any desired source of power (not here shown). It is to be noted that the width of the table 10 is slightly greater than the blades 13' carried by the cutter head 13. The blades 13' are secured in position by the screws 16 in the usual manner, there being three blades in the cutter here shown.

It will be readily observed from Fig. 2 for instance, that a board or plank of a width greater than the length of the cutter may be passed through the machine due to the fact that the end of the casting 6 supporting the outer end of the shaft of the cutter opposite the end to which the pulleys are secured is unsupported. Thus, a board may be introduced between the said outer end of the casting 6 and the table which provides what we have termed an "open sided" planer permitting introduction of a wide board on the table and in passing the same through the machine one side only will be planed and subsequently the unplaned edge may be passed through the machine and subjected to the planing operation. Thus, the machine is useful in the planing of wood elements of a very narrow width up to boards approximately of a width twice the length of the cutter blades.

The machine is adapted to plane boards of various original thicknesses and the table requires to be adjusted in a vertical plane toward or from the cutter. For this purpose the table 10 is supported on a base 17 shown in Fig. 2 and this base is supported on its inner side edge by bolts 18—18 which are threaded in the base and extend outwardly through a clamping strip 19 and a slot 20 in the inside wall of the column and through the rubber cushion elements 21 supported in sheet metal cups 22. The outer threaded ends of the bolt 18 are provided with the nuts 23 whereby the table base may be clamped in adjusted position. It will also be observed from Fig. 6 that additional clamping elements are provided consisting of the bolts 24 and 25 which extend through the table and are threaded at their outer ends to receive a nut 26 and 27, respectively. These bolts extend through the base 17 and at their inner ends are respectively provided with clamp elements 28 and 29 which have end portions 30 for engagement with the inner wall 31 of the column 2 the outer face of which is recessed to receive the clamping strip 19 By loosening the nuts of the bolts 24 and 25 and the nuts on the bolts 18, the base may be raised or lowered and the rubber washer like elements 21 on the bolts 18, when not under material compression, permit the clamp elements 28 and 29 to be loosened without, in fact, disengaging the base from the column and yet permit the base to be raised or lowered. Subsequent to the final positioning of the table relative to the cutter, the nuts on the bolts 18 may be tightened and then the clamp elements 28 and 29 may be positioned and the bolts 24 and 25 tightened to rigidly support the table in the adjusted position.

For the purpose of adjusting the table in a vertical plane, a screw 32 threaded in a boss 33 in the base 1 is provided as shown in Fig. 2. The upper end of the screw is provided with an extending shaft-like portion 34 supported in a bearing in the bottom of the base 17 and to the upper end of the shaft is secured a beveled gear 35 attached to the upper end of the extension 34 of the screw 32 there preferably being a sleeve 36 between the gear 35 and the bottom wall of the base. The gear 35 meshes with a beveled gear 37 carried by a horizontal shaft 38 which extends through the outer side of the base 17 and is there provided with a hand wheel 39 by which the shaft may be rotated to thus rotate the screw 32 and raise or lower the base. Preferably the shaft 38 is provided with a groove 39 to receive a screw 40 having an end riding in the groove to prevent longitudinal displacement of the shaft 38. By the above described means, the base carrying the table may be varied in vertical position varying the spacing between the upper surface of the table and the cutter blade.

To secure an accurate spacing of the table relative to the cutter to provide for planing a board to a predetermined thickness a graduated gauge plate 41 is provided on the outer face of the inner wall 31 of the column 2 and a pointer 42 is carried by the base 17 and extends to a position in close proximity to the graduated plate 41. The position of the pointer relative to the graduations enables the operator to set the machine to plane wood stock to a predetermined thickness irrespective of its original thickness within the limits of the capacity of the machine.

The table 10 carried by the base may be adjusted to occupy a position in a plane parallel with the axis of rotation of the cutter or at an angle thereto. For the purpose of such adjustment the base is provided with longitudinal ribs 43 and 44 extending at a right angle to the axis of the cutter and having curved upper surfaces. Companion ribs 45 and 46 are provided on the under surface of the table likewise having curved surfaces engaging the curved surfaces of the respective ribs 43 and 44 of the base. The table 10 is secured to the base 17 by the screws 47 and 48 which extend upwardly through the base into lugs 49 and 50 on the underside of the table as clearly shown in Fig. 3. The lower headed end of the bolts each engage an arcuate portion 51 and 52 each of which is provided with a similar slot 53 as shown in Fig. 6 through which these bolts respectively pass. By loosening the bolts 47 and 48, the table 10 may be rocked on the lugs 43 and 44 to position the working face of the table 10 in a plane at an angle to the axis of rotation of the cutter. Thus, boards may be planed to provide a greater thickness on one edge than on the other, it being understood that the bolts 47 and 48 are tightened after the table is positioned at the desired angle.

It is desirable that the board to be planed to a predetermined thickness shall not be greater than a certain maximum original thickness and that the board in the planing operation be supported against vertical displacement.

For this purpose a maximum thickness gauge is provided which consists of a sheet metal plate 54 at the entrance side of the head 6 having an incurved or U-edge portion 55 positioned a distance from the upper face of the table 10 greater than the distance of the cutting edge of the blades 13' which determines the depth of the cut to be made by the cutter to provide a predetermined thickness of the finished stock. The spacing of the U-shaped edge 55 from the table surface may be varied by use of a washer 56 between the plate 54 and the under face of the cutter housing at the front and rear of the cutter as shown in Fig. 1. The plate 54' at the opposite side of the cutter is similar to the plate 54 but by means of a washer of proper thickness, the free edge thereof is held lower than the free edge 55 of the plate 54. Thus the free edges of said plates engage the upper face of the stock and hold the work down on the bed 10.

It is not only desirable that the board being planed be properly held down to prevent chatter but it is also desirable to prevent the stock from being kicked back by the cutter and for this purpose each plate 54 is provided with a hinged edge 57 shown clearly in Fig. 4. The plates 54 and 54' each have an upwardly extending portion 58, as will be understood from Fig. 1, which is cut away at points 59 and 60 as shown in Fig. 4 to receive projecting eyed portions 61 and 62 of the flange and a pin 63 extends through eyes provided in the edge of the plate 54 and in the portions 61 and 62 of the flange 57 and between these eyed portions and on the pin or rod 63 are coiled springs 64 having an end portion 65 engaging the upper face of the flange 57, the springs being so coiled as to cause a downward pressure on the respective flange 57 of the two hold-down plates 54 and 54'.

As will be observed in Fig. 1 these springs are put under tension on the introduction of the board to be planed and the plates hold the board against chatter and also tend to prevent the board being pushed backwardly against the operator's hand by rotation of the cutter. The first element 54 at the entrance side of the planer having the curved flange 55 of spring metal serves to prevent introduction of a board of too great a thickness from being introduced into the machine. This hold-down device and hinged plate at the entrance side of the machine serve to break up the chips cut from the material and prevent their being thrown out against the hands of the operator. The chips are guided or discharged upwardly in the channel-way 66 which channel-way is of curved form and open at 67 on the rear side of the machine through which the material is discharged. As more clearly shown in Fig. 5, the bolts 24 and 25 have nuts 70 provided with a cylindrical portion 71 on which is supported a wrench 72 and provided with nut engaging surfaces 73 which by moving the wrench outwardly from the position shown in Fig. 5 properly engages the hexagonal face of the nut for turning the same on the respective rods 24 and 25.

It will be realized from the foregoing description that our improved planing machine is comparatively simple and inexpensive in form, a principal feature residing in the provision of a planing machine comprising a base, a column and a head arranged in a U-form with the legs in a vertical plane between which an edge of a board of greater width than the length of the cutters may be introduced in a horizontal plane; that boards may be planed to an accurate thickness determined by the setting of the table a predetermined distance from the axis of rotation of the cutter.

It is further to be noted that by adjustment of the table toward or from the cutter, the planer is adapted to plane boards of various thicknesses and each to a predetermined thickness; that the table is readily varied in angular relationship to the axis of rotation of the cutter and fixable in the adjusted position for continued service on boards required to be planed to a predetermined thickness irrespective of the variability within certain limits of the original thickness of the stock to be planed. It is further realized that the various features and objects of the invention are attained by the construction described.

Having thus fully described our invention, its utility and mode of operation, what we claim and desire to secure by Letters Patent of the United States is:

In a wood planing machine, including a frame, a rotatable cutter and a table below the cutter on which material may be passed to the cutter, means at the forward and rear sides of the cutter for holding the stock in contact with the table during movement thereof through the machine, comprising a U shaped spring metal plate secured on the head at each of the opposite sides of the cutter for engaging the stock under tension to maintain the same in contact with the table during the planing operation and a kick-back prevention device pivotally attached to each of the spring metal plates, and a spring for each of said kick-back preventive devices tending to hold the same in contact with the surface of the stock as it passes through the machine.

WALTER L. GASKELL.
OTTO P. HAISCH.